Oct. 11, 1949.   A. J. ALLEN   2,484,396
MAXIMUM DEMAND METER
Filed Oct. 27, 1948
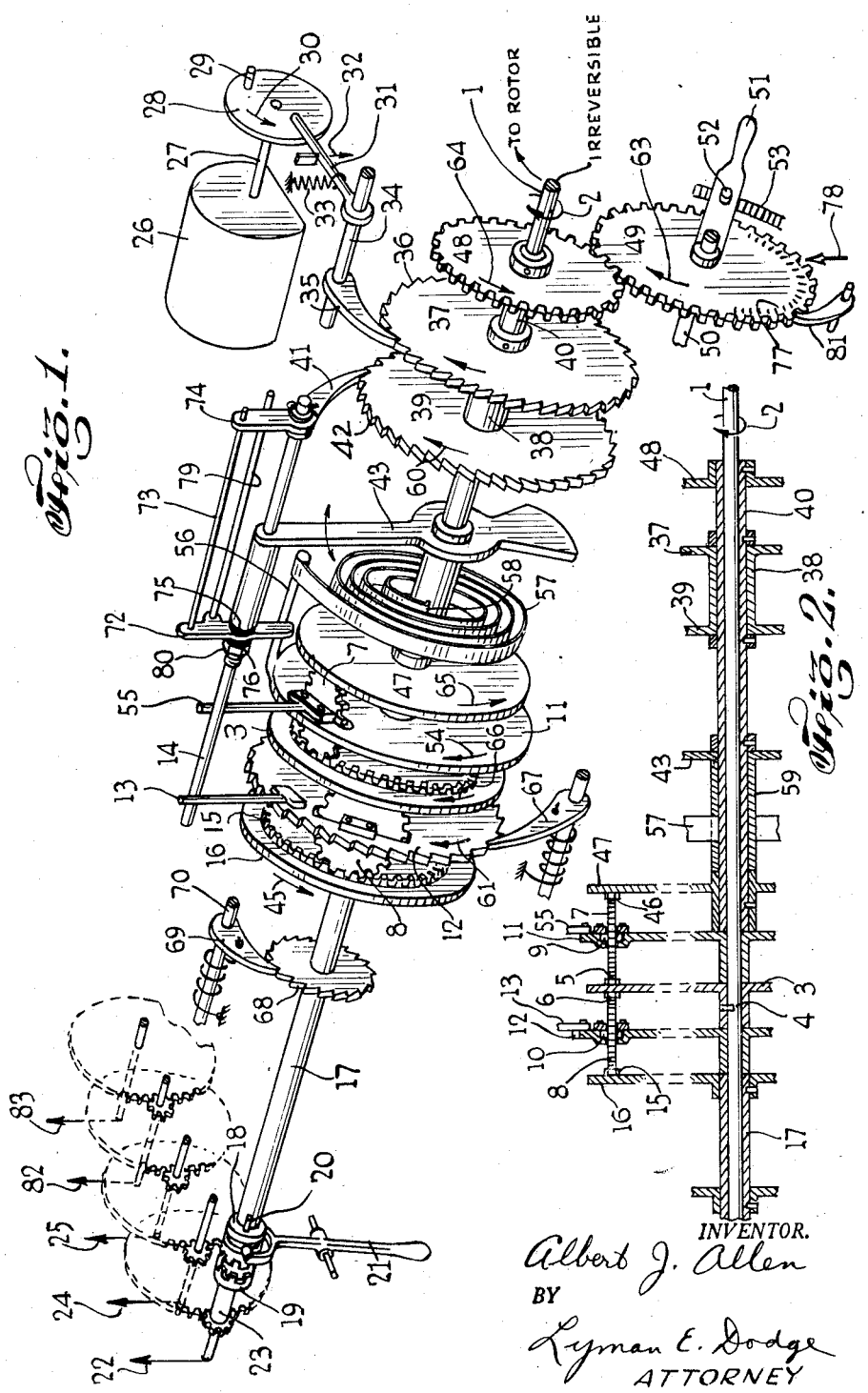
INVENTOR.
Albert J. Allen
BY
Lyman E. Dodge
ATTORNEY Patented Oct. 11, 1949

2,484,396

UNITED STATES PATENT OFFICE 2,484,396

MAXIMUM DEMAND METER

Albert J. Allen, Brooklyn, N. Y.

Application October 27, 1948, Serial No. 56,777

5 Claims. (Cl. 171—34)

This invention relates to electricity, especially to meters for the measurement thereof and particularly to meters for registering the maximum consumption of electricity during any one of successive equal intervals during a given period.

A principal object of this invention is to provide a meter of the type specified which will include two parts, one advanced by steps, proportionally to the energy consumption in each of successive predetermined equal time intervals, and another positioned to at times contact the first and thereby cause movement of a register. The first mentioned part always separated from the second mentioned part, except at starting position, at the beginning of each of successive predetermined equal time intervals, an amount proportional to the maximum energy consumption in any previous time interval since the parts were in starting position.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Figure 1 is a somewhat schematic perspective view of one embodiment of my invention and Fig. 2 is a fragmentary longitudinal sectional view of the embodiment as shown in Fig. 1.

It is well understood by those familiar with electricity, the generation, and the measurement thereof, that it is often necessary to register or record the maximum electrical consumption by a customer during any one of successive predetermined equal intervals during a given period. This maximum consumption in any one interval may be measured in any one of the usual or customary units. The most usual unit employed is the kilowatt and is expressed as maximum demand. My device is for registering this maximum demand.

As a convenient illustration of my invention, I shall consider it as part of and connected to the actuating rotor of the ordinary and well known kilowatt hour meter, that is, shaft 1 is connected to the rotor of an ordinary kilowatt hour meter and that such shaft 1 is irreversible due to the usual construction of the kilowatt hour meter to which it is connected.

The shaft 1 forms the axis about which the parts for actuating the register either rotate or revolve. The shaft 1 extends from its connection to the rotor of a kilowatt hour meter, that is, from the extreme right, as viewed in the figure, to the extreme left, as viewed in the figure and normally rotates in the direction of the arrow 2 when being driven by the kilowatt hour meter.

Of the gears and ratchet wheels rotatable about the axis of the shaft 1, the only one directly attached thereto is 3. When shaft 1 is rotated in the direction of the arrow 2, wheel 3, which is directly attached thereto, as by the pin 4, rotates therewith. Wheel 3 has gear teeth on each face thereof, as at 5 and 6. The gear teeth 5 and 6 mesh with the teeth of planetary gears 7 and 8, which are journaled on radial pins as 9 and 10 and are supported by plain wheel or disc 11 and ratchet wheel or disc 12 respectively. Both plain wheel 11 and ratchet wheel 12 are free to rotate about the shaft 1.

When all parts are in the starting or zero position, as shown by Fig. 1, ratchet wheel 12 is prevented from rotation because it has radial arm 13 attached thereto, which radial arm is in contact with a stop rod 14 which is not free to revolve about the axis of shaft 1 under the conditions as illustrated in Fig. 1. Consequently, as ratchet wheel 12 cannot rotate about shaft 1, planetary gear 8 when caused to rotate on its axis, rotates wheel 16, because the teeth of planetary gear 8 mesh with the teeth 15 in the face of wheel 16.

Wheel 16 is mounted on and fixed rigidly to a sleeve 17 which surrounds shaft 1 and is rotatable thereabout freely. This sleeve 17 carries one part 18 of a two part clutch of which the mating part is 19. The clutch part 18 is feathered by means of feather 20 to the sleeve 17 so that it is driven by sleeve 17 when sleeve 17 rotates, but is slidable longitudinally along sleeve 17. When the clutch part 18 is moved by means of the clutch handle 21 into engagement with the clutch part 19, then the units wheel 22 of the register is caused to rotate because the units wheel and clutch part 19 are both mounted on and rigidly attached to a short sleeve 23 mounted on and freely rotatable about shaft 1.

This clutch formed of parts 18, 19 and 21 is for convenience only. Normally the two parts of the clutch are engaged. Only under certain circumstances would the two parts be disengaged. One of these circumstances would be for restoring a reading of the register indication following tests upon the mechanism interposed between the right hand end of the shaft 1 and the sleeve 17.

It is understood that just so long as sleeve 17 rotates, registration is made on the register. Units are exhibited by dial pointer 22. Tens, hundreds, thousands and ten-thousands, by the dial pointers 24, 25, 82, and 83, respectively, as is usual.

If all of the pointers of the register comprising the indicating pointers 22, 24, 25, 82, and 83, were at a zero position or at a known position at a given instant of time, and then the shaft 1 were caused to rotate for a definite predetermined interval of time, causing a registration to be made, the demand during that given predetermined interval would be known. I desire to utilize my device to give just such information. In order to get such information, I have provided means to indicate upon the register the maximum electrical consumption during a given predetermined interval. In order to do this, I have provided a timing element. My timing element is, preferably, a synchronous electric motor, indicated by 26. It includes a rotating shaft 27 which, in the particular arrangement shown, carries a disc 28 having an outstanding arm 29. The disc 28 rotates in the direction of the arrow 30 and at the expiration of successive equal intervals of time the arm 29 contacts the trip arm 31, deflecting it in the direction of the arrow 32 against the tension of the spring 33, and so rotating suitably supported shaft 34 on its longitudinal axis, thus causing pawl 35 to be raised out of engagement with the teeth 36 of ratchet wheel 37.

The ratchet wheel 37 is mounted on a sleeve 38 or formed integral therewith which also has mounted thereon, or formed integral therewith, a ratchet wheel 39. The sleeve 38 is mounted so as to rotate freely upon a sleeve 40 surrounding shaft 1.

A pawl 41 is mounted on stop rod 14 and engages the teeth 42 of ratchet wheel 39. Stop rod 14 is supported by arm 43 mounted and rotatable freely on sleeve 40.

When shaft 1 rotates it not only causes wheel 16 to rotate in the direction of the arrow 45, but as planetary gear 7 has its teeth engaging with the teeth 5 of wheel 3 and engages with the teeth 46 of wheel 47, either 11 or 47 must rotate. Wheel 47 is connected rigidly to sleeve 40 and sleeve 40 rigidly carries gear wheel 48 which meshes with gear wheel 49 mounted on shaft 50. Normally gear wheel 49 is restrained from rotation by reason of manually operable handle 51 which is attached thereto and resists rotation by reason of spring pressed detent 52 and toothed rack 53, and also by pawl 81, which engages in the teeth on wheel 49.

In view of the above described constructions it will be seen, that when shaft 1 is turned and wheel 3 attached thereto is rotated, and the teeth 5 engage the teeth of planetary gear 7, that as the teeth of planetary gear 7 engage the teeth 46 of gear wheel 47 which is attached to sleeve 40 which is rendered incapable of rotation, at this time, by reason of its connection to gear wheel 48 and through that to gear wheel 49 and the manually operable handle 51, that 47 cannot rotate about shaft 1 under the conditions, consequently, wheel 11, which is mounted free to rotate upon shaft 1 rotates about shaft 1 in the direction of the arrow 54 carrying with it radial arm 55 and spring tensioning arm 56.

The movement of 56 about the axis of shaft 1 places tension on the spring 57 which has its inner end 58 connected to the sleeve 59 and this sleeve 59 has rigidly attached thereto the arm 43, that is, if spring 57 had tension applied thereto by the movement of 56 about the axis of shaft 1, arm 43 would likewise move, but under the conditions as illustrated in Fig. 1, arm 43 is not free to rotate about shaft 1, consequently, the only effect, for the moment, of rotating wheel 11 and revolving arm 56 is to tension spring 57 without causing any movement of arm 43, but radial arm 55 is moved an arcuate distance corresponding to the amount which is indicated on the register.

When the definite predetermined period of time has elapsed and pawl 35 is moved from engagement with the teeth 36 of ratchet wheel 37, then the spring tension in spring 57 can move arm 43 together with the stop rod 14 about the axis of shaft 1 by causing the pawl 41 engaging in teeth 42 of ratchet wheel 39 to rotate ratchet wheel 39 rigidly attached to ratchet wheel 37 in the direction of the arrow 60 and the spring 57 will so cause a partial rotation of arm 14 until it contacts radial arm 55, that is, it will move stop rod 14 an arcuate distance corresponding precisely to the amount of rotation that was indicated on the register during a specified predetermined time interval.

The above described partial rotation of arm 14 about the axis of shaft 1 takes place in a mere instant of time, and after it has taken place all parts are then in the position where a given demand for a given predetermined time interval has been indicated on the register and the parts then so moved that 55 and 13 are separated by a corresponding arcuate amount.

With all of the parts as left after the first predetermined time interval has elapsed, if a further rotation of shaft 1 occurs, then the arm 13 would not be in contact with stop rod 14 because 14 was moved around in a clockwise direction to contact 55 in its new position, consequently, the rotation of shaft 1 and wheel 3 will not move wheel 16 at first, it will, however, move ratchet wheel 12 around in the direction of the arrow 61. At the same time, radial arm 55 will be advanced synchronously with 13. If, during the second interval of predetermined time, the customer's consumption of electricity is not as great as during the first predetermined time, then 13 will not reach 14 and 55 will be moved synchronously with 13 to assume a new position which will define a new position of 14 when the predetermined time has elapsed and pawl 35 is raised. However, if, during the second predetermined time interval, the customer's consumption of electricity is greater than that during the first predetermined time interval, then 13 will sooner or later contact 14, thereby stopping further rotation of ratchet wheel 12, whereupon, just as before, wheel 16 will begin to turn in the direction of the arrow 45 and indicate a higher amount on the register than was indicated during the first predetermined time interval.

If the consumption is less in the second time interval, then at the expiration of that time interval, the radial arm 55 has an arcuate separation from arm 13 which is proportional to the amount of electricity consumed in the first time interval. If the consumption in the second time interval was greater than that in the first time interval, the final arcuate separation between the position of 55 and the position of 13 will be equivalent in arcuate spacing to the amount of electricity consumed by the customer in the second predetermined time interval.

As each predetermined time interval is run off by the motor 26 motion will be given the various wheels and gears as hereinbefore described. The starting or zero position would be as shown in Fig. 1, with 13 abutting 14 and 14 abutting 55. As successive time intervals elapse, and as various quantities of electricity are consumed by the customer during the various time intervals, 55 and 13 will, at the beginning of each succeeding time interval, be positioned an arcuate distance apart corresponding to the registration of the largest amount of electricity consumed in any previous time interval. They will so remain apart until a time interval occurs in which a still larger quantity of electricity is consumed whereupon they will be spaced a distance apart corresponding to the increased consumption so that the arcuate spacial distance apart of 13 and 55 at the end of any time interval corresponds with the maximum consumption of electricity in any preceding time interval as indicated on the register.

If the device is conditioned as shown in Fig. 1 and then shaft 1 starts to rotate at the beginning of a time interval and during that time interval the customer consumes the greatest amount of electricity that is consumed by him during any period, say during the ensuing month, then the indication placed on the register by that first time interval will never be changed during the whole month because it represents the maximum consumption of electricity for the predetermined time interval for the period of a month. However, if, at any time during the said month, the customer consumes more electricity in a given predetermined time interval, then the register would be altered to indicate the greater amount, thus, at given or predetermined period expirations, the register may be read and the reading will be proportional to the maximum consumption of electricity for a given predetermined time interval for the period since the last reading of the meter, in short, will indicate what is commonly called the maximum demand for a given time interval over a definite period.

As it is customary and usual to fix a period at which to read the meter and base the charge for maximum demand upon the reading thereof, some means must be provided whereby a new start, so to speak, can be made at equal periods of time, such as say, each month. In my construction, I provide means whereby a start may be made afresh at the beginning of each of the periods and at the same time the accumulative result of all previous readings is retained.

The handle 51 can be moved manually to sweep the spring-pressed detent 52 over the toothed rack 53. When it is so moved, gear wheel 49 can be rotated in the direction of the arrow 63 and as 48 is connected to sleeve 40 it will rotate 47 in a direction of the arrows 65 and the teeth 46 on 47 meshing with the teeth on planetary gear 7, (wheel 3 prevented from rotation in a direction contrary to the arrow 66 by the irreversibility of shaft 1) wheel 11 will be moved in a direction contrary to the arrow 54, thus moving radial arm 55, and radial arm 55 will rotate stop rod 14 counterclockwise about shaft 1 until stop rod 14 comes in contact with 13 whereupon a zero setting of the device is obtained, that is, with 13 bearing against 14 and 14 bearing against 55, although the position of 13, 14 and 55 may not be precisely as shown in Fig. 1 because it may well be, and probably would be, that 13 would be found in a position other than pointing directly upward from shaft 1 as shown in Fig. 1, but whatever the position of 13, when the parts 13, 14 and 55 are brought to the position as illustrated by Fig. 1, the device would be in the zero position for the beginning of a new period of, say a month. When this has been done, the manually operable hand lever 51 will prevent movement of gear wheel 49.

It will be noted that when stop rod 14 contacts radial arm 13 in returning the device to zero, ratchet wheel 12 cannot be rotated in a direction contrary to the arrow 61 because the pawl 67 prevents such motion. Further turning of gear wheel 49 after 14 contacts 13 is stopped because 12 is stopped by 67 and no effect in making a change in the register can occur, because further movement of 49 and so 47 cannot take place. When 13 is held from movement in a direction contrary to the arrow 61 by pawl 67, planetary gear 8 cannot move bodily about the axis of shaft 1 and it cannot rotate 16 contrary to the arrow 45 because of ratchet wheel 68 and pawl 69 which prevents clockwise rotation of sleeve 17 to which 68 is rigidly attached and 69 is held on a shaft 70 mounted on any suitably fixed bearings.

It might be that the total quantity of electricity consumed in any one time interval would be greater than the capacity of the meter to register as of that interval. This contingency has been provided for in the following way. As 55 is moved in a given time interval, then 56 will be correspondingly moved as it is attached to wheel 11. Just before completing the full movement it will come in contact with arm 72 which is journaled on stop arm 14 and will move that arm so that the top end thereof will move to the left, as viewed in Fig. 1, that will cause rod 79 and the spring arm 73 passing through the tang end 74 of pawl 41 to be moved to the left, as viewed in Fig. 1, and so raise pawl 41 out of engagement with the teeth 42 of the wheel 39. It would keep the pawl out of engagement with the teeth because 72 is held between two friction discs 75 and 76, adjustably held by nut 80, so that when 72 is turned it remains in turned position and so retains pawl 41 out of engagement with teeth 42 until manually replaced. The disengagement of pawl 41 from teeth 42 allows the tension spring 57 to bring arm 43 and stop rod 14 around shaft 1 to a position in contact with 55. After pawl 41 has been taken out of the teeth 42 of wheel 39 and before 72 is manually replaced, the device is inoperative, to further register the demand of a customer as rotation of shaft 1 causes rotation of 55 about it, but 14 is kept by spring 57 constantly in contact with 55 so that there is no opportunity to control the movement of 13 by 14 and so no further registration can take place.

It will be noted that this freeing of the mechanism and movement of pawl 41 out of the path of teeth 42 will occur either if the capacity of the device is exceeded in a given predetermined time interval or if the time interval mechanism fails.

It may at times be necessary to adjust the device for test or maintenance purposes, so that it is necessary to manually place the device in its zero position. This, of course, will alter the displaced positions of 13 and 55 and their relation one to the other. In order to allow the interference to be made but still restore conditions after the interference, a scale or graduation 77 is provided on wheel 49 and a reference mark 78 on an adjacent fixed structure. If it is necessary to interfere, as mentioned, then before the interference the reading of the graduations in regard to fixed point 78, is noted. After the interference, the wheel 49 is returned to the position such that the reading is as it was originally before the interference, moving pawl 81 by hand, if necessary.

Although I have particularly described one particular physical embodiment of invention and explained the construction thereof, nevertheless, I desire to have it understood that the form selected is merely illustrative, but does not exhaust the possible physical embodiment of the idea of means underlying my invention.

What I claim as new and desire to secure by Letters Patent is:

1. A device for registering the maximum energy consumption in an electrical circuit during any one of successive predetermined equal time intervals comprising, in combination: a shaft rotatable in accordance with the energy consumption in the circuit; a first radial arm adapted to revolve about the shaft; a stop arm adapted to revolve about the shaft and movable in the path of the first radial arm; a first means, including a time interval device, causing movement of the stop arm only at the expiration of predetermined equal time intervals; a second means operated by the shaft to revolve the radial arm when the stop arm is not in contact therewith; a register and a second means including the first mentioned means for operating said register when the first radial arm contacts the said stop arm; a second radial arm revolvable about the shaft lying in the path of said stop arm, said stop arm being limited in revolution by the second radial arm; a third means for revolving the second radial arm proportionally to the rotation of the shaft whereby rotation of the shaft when the first radial arm is in contact with the stop arm will register the maximum energy consumption for the predetermined time interval and the stop arm will then be revolved about the shaft an amount corresponding with the said maximum energy consumption and at the beginning of successive predetermined equal time intervals the stop arm will always be ahead of the first radial arm an amount corresponding to the maximum energy consumption and in any previous predetermined time interval.

2. In a device for registering the maximum energy consumption in an electrical circuit during any one of successive predetermined equal time intervals comprising, in combination: a shaft rotatable in accordance with the energy consumption in the circuit; a first radial arm adapted to revolve about the shaft; a stop arm adapted to revolve about the shaft and movable in the path of the first radial arm; a first means, including a time interval device, causing movement of the stop arm only at the expiration of predetermined equal time intervals; a second means operated by the shaft to revolve the radial arm when the stop arm is not in contact therewith; a register and a second means including the first mentioned means for operating said register when the first radial arm contacts the said stop arm; a second radial arm revolvable about the shaft lying in the path of said stop arm, said stop arm being limited in revolution by the second radial arm; a third means for revolving the second radial arm proportionally to the rotation of the shaft whereby rotation of the shaft when the first radial arm is in contact with the stop arm will register the maximum energy consumption for the predetermined time interval and the stop arm will then be revolved about the shaft an amount corresponding with the said maximum energy consumption and at the beginning of successive predetermined equal time intervals the stop arm will always be ahead of the first radial arm an amount corresponding to the maximum energy consumption and in any previous predetermined time interval and a fourth means, manually operable for setting the first radial arm, the second radial arm, and the stop arm in contact whereby a new period of successive predetermined equal time intervals will be started.

3. In a device for registering the maximum energy consumption in an electrical circuit during any one of successive predetermined equal time intervals comprising, in combination: a shaft rotatable in accordance with the energy consumption in the circuit; a first radial arm adapted to revolve about the shaft; a stop arm adapted to revolve about the shaft and movable in the path of the first radial arm; a first means, including a time interval device, causing movement of the stop arm only at the expiration of predetermined equal time intervals; a second means operated by the shaft to revolve the radial arm when the stop arm is not in contact therewith; a register and a second means including the first mentioned means for operating said register when the first radial arm contacts the said stop arm; a second radial arm revolvable about the shaft lying in the path of said stop arm, said stop arm being limited in revolution by the second radial arm; a third means for revolving the second radial arm proportionally to the rotation of the shaft whereby rotation of the shaft when the first radial arm is in contact with the stop arm will register the maximum energy consumption for the predetermined time interval and the stop arm will then be revolved about the shaft an amount corresponding with the said maximum energy consumption and at the beginning of successive predetermined equal time intervals the stop arm will always be ahead of the first radial arm an amount corresponding to the maximum energy consumption and in any previous predetermined time interval and a fourth means, manually operable for setting the first radial arm, the second radial arm, and the stop arm in contact whereby a new period of successive predetermined equal time intervals will be started and a fifth means for preventing backward movement of the register during the manual setting whereby the register accumulates the maximums of successive periods.

4. A device for registering the maximum energy consumption in an electrical circuit during any one of successive predetermined equal time intervals comprising, in combination: a shaft rotatable in accordance with the energy consumption in the circuit; a first radial arm adapted to revolve about the shaft; a stop arm adapted to revolve about the shaft and movable in the path of the first radial arm; a first means including a planetary gear and including a time interval device, causing movement of the stop arm only at the expiration of predetermined equal time intervals, a second means operated by the shaft to revolve the radial arm when the stop arm is not in contact therewith; a register and a second means including the first mentioned means for operating said register when the first radial arm contacts the said stop arm; a second radial arm revolvable about the shaft lying in the path of said stop arm, said stop arm being limited in revolution by the second radial arm; a third means, including a planetary gear, for revolving the second radial arm proportionally to the rotation of the shaft whereby rotation of the shaft when the first radial arm is in contact with the stop arm will register the maximum energy consumption for the predetermined time interval and the stop arm will then be revolved about the shaft an amount corresponding with the said maximum energy consumption and at the beginning of successive predetermined equal time intervals the stop arm will always be ahead of the first radial arm an amount corresponding to the maximum energy consumption in any previous predetermined time interval, said fourth means rotating all of the planetary gears in the same direction in which they are moved when acting as a part of the first and third means.

5. A device for registering the maximum energy consumption in an electrical circuit during any one of successive equal time intervals comprising a device for registering the total energy consumption during a time period including a rotor for actuating the registering device; a shaft mounted for rotation and connected to be rotated by said rotor; a first wheel mounted on and attached to said shaft to rotate therewith about the longitudinal axis of the shaft, said wheel provided with gear teeth on opposite faces thereof; two-further wheels, one mounted on said shaft at one side of said first wheel and the other on the other side of said first wheel and both free to rotate about said shaft and each bearing a projecting radial arm; two planetary gears, one carried by each of said two-further wheels and supported thereon by a shaft radially positioned in relation to said further wheels; a sleeve surrounding said shaft and rotatable thereon; a third wheel attached to said sleeve with its geometric center coinciding with the geometric center of said shaft, positioned on one side of said first wheel beyond one of said two-further wheels and formed with teeth in its face meshing with the planetary gear carried by the adjacent said further wheel; a registering mechanism connected to and operable by said sleeve whereby when the radial arm on the said adjacent further wheel is prevented from revolving about the longitudinal axis of said shaft the said registering mechanism will be actuated to indicate energy consumption; a stop rod positioned to prevent movement of the radial arm on the said adjacent further wheel; a supporting arm rigidly attached to and supporting said stop rod; a second sleeve surrounding said shaft; a third sleeve surrounding said second sleeve and rotatable independently thereof and thereon, said third sleeve rigidly attached to and supporting said supporting arm; a spiral spring surrounding said shaft and having its inner end connected to said third sleeve; a revolvable arm, said revolvable arm connected at one end to the outer end of said spiral spring and at the other end to the other of said two-further wheels of which the radial arm extends on the other side of said stop rod from the side on which extends the radial arm of the said adjacent further wheel; a first pawl carried by said stop rod; a fourth sleeve surrounding said second sleeve and rotatable independently thereof and thereon; two ratchet wheels, both attached to said fourth sleeve, the ratchet teeth in one wheel pointing in the opposite direction to those in the other wheel, the first pawl engaging the ratchet teeth of one of the ratchet wheels with the teeth arranged so that the stop arm may not revolve with the supporting arm when the said one of the ratchet wheels cannot rotate; a second pawl engaging the teeth of the other ratchet wheel; a timing motor; means operated by the timing motor to raise the second pawl momentarily at successive predetermined time intervals; a fourth wheel positioned adjacent the other of said two-further wheels and on the side thereof remote from the said first wheel, said fourth wheel formed with teeth in its face meshing with the planetary gear carried by the adjacent wheel, said fourth wheel attached to and rotatable with said second sleeve; a fifth gear wheel attached rigidly to said second sleeve; a sixth gear wheel meshing with said fifth gear wheel; means for preventing the rotation of said sixth gear wheel and for manually rotating it when desired whereby when said fifth gear wheel is prevented from rotation and said shaft is rotated the other of said two-further wheels will be rotated and the radial arm attached thereto advanced and the spring arm rotated tensioning the spring until the said second pawl is raised from engagement with the ratchet teeth of the one of the ratchet wheels with which it engages whereupon the stop arm will be revolved to contact the advanced radial arm and whereby a manual rotation of the fifth gear wheel will return the radial arms and stop arm to starting position with one radial arm in contact with the stop arm and in advance thereof and the other in contact and in the rear thereof.

ALBERT J. ALLEN.

No references cited.